United States Patent [19]
Umemoto et al.

[11] Patent Number: 5,536,219
[45] Date of Patent: Jul. 16, 1996

[54] REAR AXLE APPARATUS FOR A TRACTOR

[75] Inventors: Tomeo Umemoto; Mitsuhiro Kosaka, both of Sakai, Japan

[73] Assignee: Kubota Corporation, Japan

[21] Appl. No.: 328,726

[22] Filed: Oct. 25, 1994

[30] Foreign Application Priority Data

Nov. 26, 1993 [JP] Japan ................................ 5-296915

[51] Int. Cl.$^6$ ........................................................ B60B 35/00
[52] U.S. Cl. ........................................................... 475/225
[58] Field of Search ........................... 74/606 R; 475/225, 475/331

[56] References Cited

U.S. PATENT DOCUMENTS

| | | | |
|---|---|---|---|
| 2,032,025 | 2/1936 | Nardone | 74/606 R |
| 2,826,095 | 3/1958 | Dirzius et al. | 74/606 R |
| 3,956,945 | 5/1976 | Eggleton et al. | 475/225 |
| 4,073,358 | 2/1978 | Szalai | 475/225 |
| 4,424,874 | 1/1984 | Koike et al. | 475/225 |

FOREIGN PATENT DOCUMENTS 128135   3/1988   Japan ............................. B60K 23/04

*Primary Examiner*—Dirk Wright
*Attorney, Agent, or Firm*—Webb Ziesenheim Bruening Logsdon Orkin & Hanson

[57] ABSTRACT

A rear axle apparatus for a tractor having differential gear shafts driven by power transmitted from a transmission, rear axles connected to the differential gear shafts through planetary reduction mechanisms, and brakes for braking the differential gear shafts through brake disks engaged with the differential gear shafts. The apparatus includes a rear axle case connectable to a case of the transmission and having an inner peripheral surface. Each planetary reduction mechanism includes a ring gear mounted on the inner peripheral surface of the rear axle case. A brake support receives one of the brake disks. The brake support is mounted on the inner peripheral surface of the rear axle case, and arranged parallel to the ring gear substantially along the rear axles. A rotation stopper limits rotation of the brake support and the ring gear relative to the rear axle case.

13 Claims, 5 Drawing Sheets

REAR AXLE APPARATUS FOR A TRACTOR

BACKGROUND OF THE INVENTION

1. Field of the Invention

The present invention relates to a rear axle apparatus for a tractor having a rear axle case and brake structure. More particularly, the invention relates to a structure including brakes arranged relative to rear axle cases to brake rotation of differential gear shafts.

2. Description of the Related Art

This type of structure provided around rear axles of a tractor is disclosed in Japanese Utility Model Publication No. 1988-128135, for example. FIG. 8 shows a principal portion of the structure disclosed in the above publication. As seen, the prior structure includes what is called a brake case 51 mounted between a transmission case 50 and a rear axle case 52. The brake case 51 has a brake support 56 formed as an inward and integral part thereof for contacting brake disks rotatable with a differential gear shaft. A planetary reduction mechanism 53 has an internal gear 54 fixedly mounted between the brake case 51 and rear axle case 52.

The above prior structure includes what is called a brake case, formed separately from the rear axle case, for supporting or defining a brake support. Thus, the prior structure is complicated with a large number of components, which results in high cost.

When it is desired to manufacture a modified version of the above structure with an increased number of brake disks, for example, a change in the position of a supporting surface of the brake support becomes imperative. Such a modification is possible only by manufacturing a new brake case having a brake support of different shape or disk receiving position. It is unreasonable and costly to design and manufacture a large component such as a brake case all over again just to increase the number of brake disks. Thus, improvement has been desired.

SUMMARY OF THE INVENTION

Having regard to the drawback of the prior art, the object of the present invention is to provide a rear axle case structure for a tractor which has a relatively small number of components, and which allows a modification, such as an increase in the number of brake disks, to be made simply by changing a relatively small component.

The above object is fulfilled, according to the present invention, by a rear axle case and brake structure for a tractor comprising a rear axle case connected to a side of a transmission case, and an internal gear and a brake support arranged not to be rotatable inside the rear axle case and substantially parallel to each other along an axis of a rear axle.

The above structure according to the present invention dispenses with the brake case included in the conventional structure. With the large brake case now omitted, a reduction in manufacturing cost may be achieved. Although the brake support is added, this component is smaller than the brake case and substantially lowers the total cost. A change in brake capacity requires only a design change and manufacturing cost of the small brake support, or shaping of one side surface of the brake support. Thus, the structure according to the present invention is adaptable and contributes toward cost reduction.

Other features and advantages of the present invention will be apparent from the following description.

DETAILED DESCRIPTION OF THE PREFERRED EMBODIMENTS

Embodiments of the present invention will be described with reference to the drawings.

Figure 1:
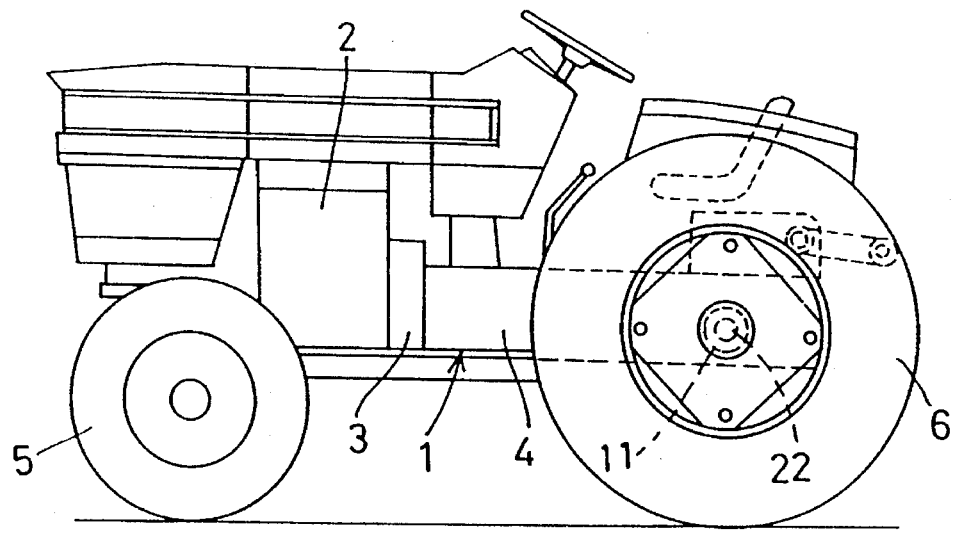
FIG. 1 a side elevation of a tractor.
Figure 3:
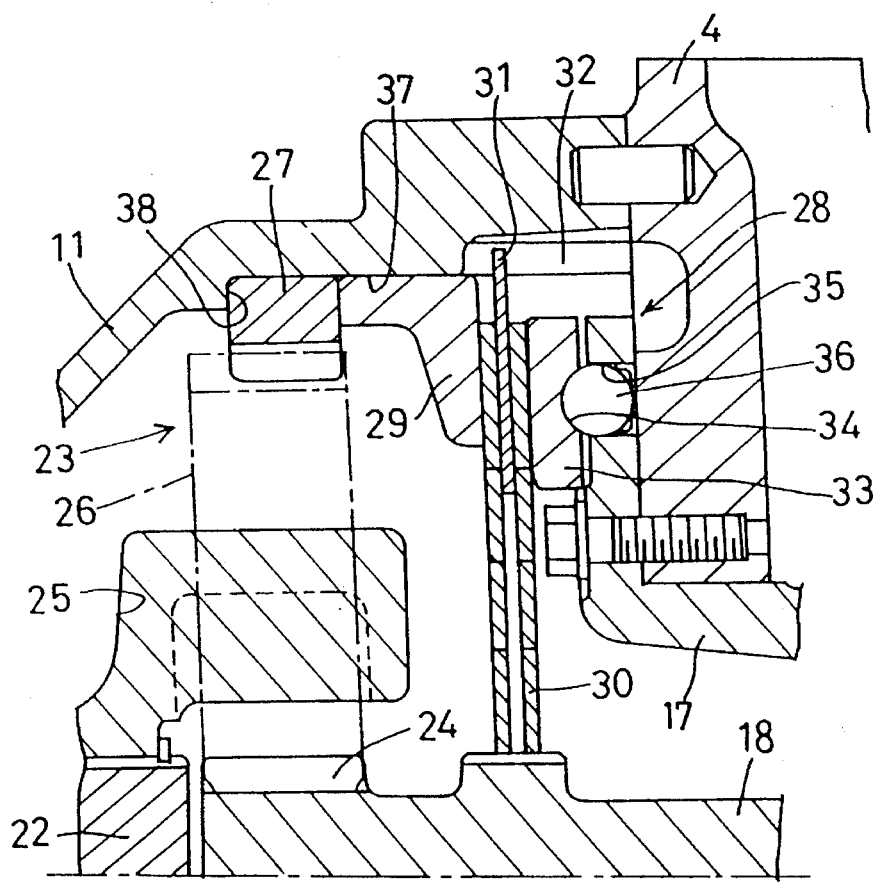
FIG. 3 is an enlarged sectional view of a portion of FIG. 2 clearly showing a region of a brake support.

FIG. 1 is a side elevation of a tractor. The tractor has a chassis 1 formed of an engine 2, a clutch housing 3 and a transmission case 4 rigidly connected to one another. The chassis 1 is supported by front wheels 5 and rear wheels 6. The rear wheels 6 are connected to the chassis 1 through rear axle cases 11.

Figure 2:
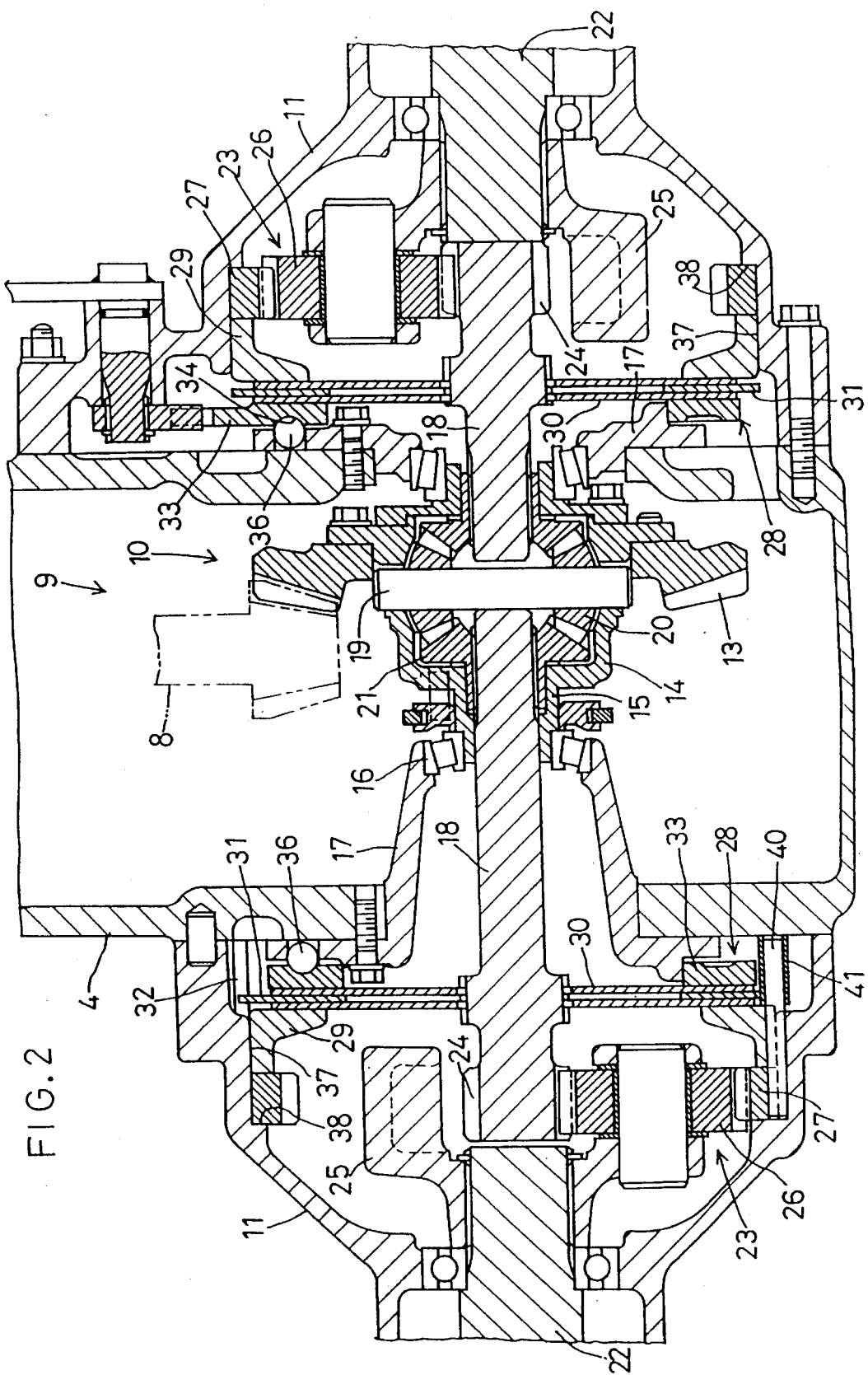
FIG. 2 is a sectional view of a region of rear axles showing a portion of a transmission case, a differential, a rear axle case, a reduction gear mechanism, and portions of the rear axles.

FIG. 2 shows a section of a rear axle region. Numeral 9 denotes a rear wheel drive apparatus of the tractor. A differential 10 is mounted in a rear portion of the transmission case 4. Rear axle cases 11 are arranged on outer surfaces of the transmission case 4 at opposite positions laterally of the differential 10. The rear axle cases 11 are fixed tight to the transmission case 4 by bolts 12.

The differential 10 has a differential gear 13 fixed to a differential case 14 and meshed with a drive pinion 8 extending from a transmission. The differential case 14 has bosses 15 formed at opposite lateral ends thereof, with roller bearings 16 mounted on the bosses 15. The differential case 14 is rotatably supported through the roller bearings 16 by bearing cases 17 attached to opposite lateral walls of the transmission case 4. The differential case 14 includes differential gear shafts 18 projecting laterally outwardly through the bosses 15. Each differential gear shaft 18 projects laterally outwardly of the transmission case 4. The differential case 14 contains differential pinions 20 mounted on a pinion shaft 19 and meshed with differential side gears 21 splined to the differential gear shafts 18.

Each rear axle case 11 rotatably supports a rear axle 22 to be coaxial with the differential gear shaft 18. Power is transmitted from the differential gear shaft 18 to the rear axle 22 through a planetary reduction mechanism 23. The planetary reduction mechanism 23 includes a sun gear 24 fixed to the differential gear shaft 18, a carrier 25 fixed to the rear axle 22, planet gears 26 rotatably supported by the carrier 25, and a ring gear 27 mounted between the and rear axle case 11 and a brake support 29 described hereinafter.

Each rear axle case 11 contains a brake 28. The brake 28 includes the brake support 29 disposed inwardly of and in contact with the ring gear 27. The brake 28 further includes a plurality of brake disks 30. The brake disks 30 are splined to the differential gear shaft 18 in a close positional relationship with the brake support 29, and an annular friction plate 31 is disposed between the brake disks 30. The friction plate 31 is fixed to the rear axle case 11 by a pin 32 not to be rotatable relative thereto. A presser ring 33 is placed in contact with an inward surface of the inward brake disk 30. The presser ring 33 defines a cam groove 34 of varying depth in a surface remote from the brake disks 30. The bearing case 17 has a flange defining recesses 35 in which balls 36 are rotatably fitted for contacting cam surfaces in the cam groove 34.

With rotation of the presser ring 33, the cam groove 34 rotates in contact with the balls 36, whereby the presser ring 33 is pushed outward. At this time, the presser ring 33 presses the brake disks 30, with the friction plate 31 sandwiched therebetween, upon the brake support 29. Consequently, a braking force is applied to the differential gear shaft 18 to which the brake disks 30 are splined.

The brake support 29 has an annular overall configuration. This annular configuration is defined by an outward end surface for contacting the ring gear 27, an inward end surface having a larger area than the outward end surface for contacting the brake disk 30, an outer peripheral surface of substantially fixed outside diameter extending between the inward and outward end surfaces and fitting with an inner peripheral surface 37 of the rear axle case 11, and an inner peripheral surface of substantially diminishing diameter from the outward end surface to the inward end surface. The brake support 29 of brake 28 and the ring gear 27 of planetary reduction mechanism 23 have the same outside diameter, and are fitted in contact with the inner peripheral surface 37 of the rear axle case 11. The ring gear 27 disposed outwardly of the brake support 29 is in contact with a shoulder 38 formed on the inner peripheral surface 37, thereby to be stopped moving outward. Outward movement of the brake support 29 is stopped through contact with the ring gear 27. The brake support 29 and ring gear 27 are both prevented from rotating relative to the rear axle case 11 by a fixing device described hereinafter.

The above embodiment dispenses with the brake case for supporting the brake support, and instead includes the brake support 29 which is smaller than the brake case and is mounted inside the rear axle case. When it is desired to increase the numbers of brake disks 30 and friction plates 31 to increase the capacity of brake 28, the brake support 29 may simply be cut at one side surface to vary its size, thereby to save cost.

FIGS. 4 through 7 show devices for locking the brake support 29 and ring gear 27 against rotation relative to the rear axle case 11.

Figure 4:
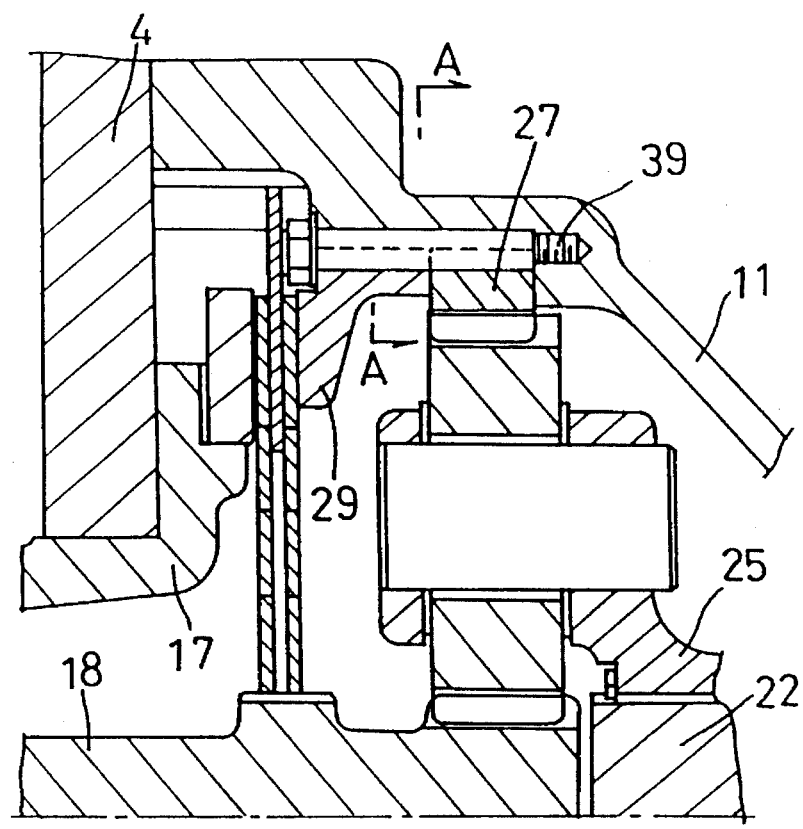
FIG. 4 is a view similar to FIG. 3 and showing a device for locking the brake support and ring gear against rotation relative to the rear axle case.
Figure 5:
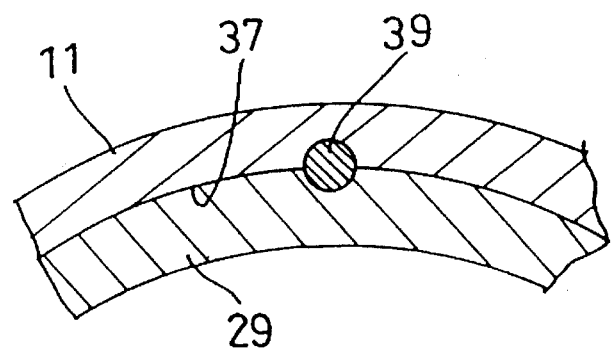
FIG. 5 is a section taken on line A—A of FIG. 4.

In FIGS. 4 and 5, the brake support 29 and ring gear 27 are locked against rotation by a bolt 39 extending along an interface between outer peripheral surfaces of the brake support 29 and ring gear 27 and inner peripheral surface 37 of the rear axle case 11.

Figure 6:
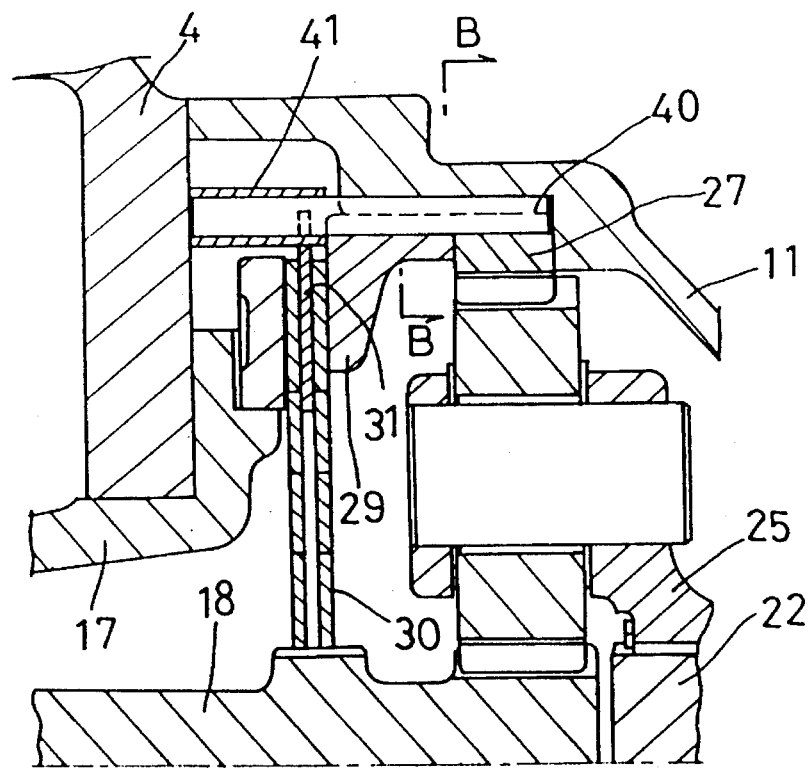
FIG. 6 a view similar to FIG. 4 and showing a modified device for locking the brake support and ring gear against rotation relative to the rear axle case.
Figure 7:
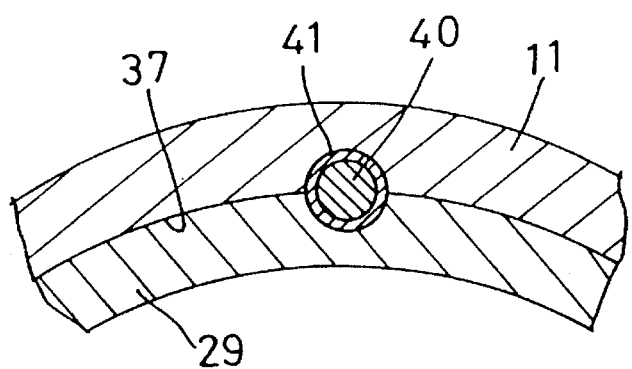
FIG. 7 is a section taken on line B—B of FIG. 6.
Figure 8:
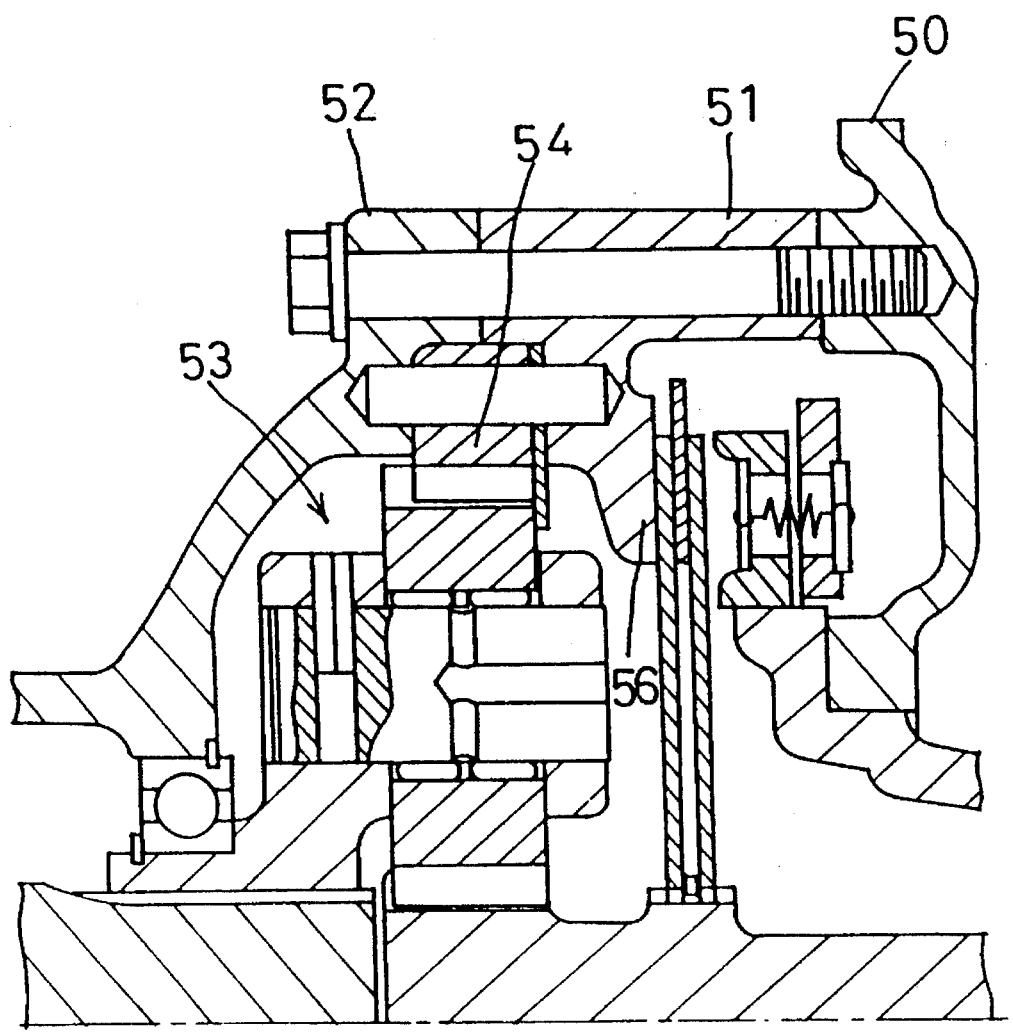
FIG. 8 is a view similar to FIG. 3 and showing a known rear axle case structure.

The embodiment shown in FIGS. 6 and 7 employs a knock pin 40 as a device for preventing rotation of the brake support 29 and ring gear 27. A spacer 41 is mounted on the knock pin 40 to limit inward movement of the brake support 29 and ring gear 27. The spacer 41 may also be engaged with the friction plate 31 to prevent rotation thereof. Thus, this embodiment may dispense with the pin 32 included in the first embodiment.

What is claimed is:

1. A rear axle apparatus for a tractor having a differential gear shaft driven by power transmitted from a transmission, a rear axle connected to the differential gear shaft through a planetary reduction mechanism, and a brake for braking the differential gear shaft through brake disks engaged with the differential gear shaft, said apparatus comprising:

a rear axle case connectable to a case of said transmission and having an inner peripheral surface;

a ring gear included in said planetary reduction mechanism, said ring gear being mounted on said inner peripheral surface of said rear axle case;

a brake support having a supporting surface for receiving one of said brake disks, said brake support being mounted on said inner peripheral surface of said rear axle case, and said brake support being juxtaposed with said ring gear substantially along said rear axles;

rotation stopper means for limiting rotation of said brake support and said ring gear relative to said rear axle case; and spacer means for limiting inward movement of said ring gear and said brake support.

2. A rear axle apparatus as defined in claim 1, wherein said brake support has an annular shape.

3. A rear axle apparatus as defined in claim 1, wherein said inner peripheral surface includes a shoulder for contacting said ring gear, said ring gear and said brake support being positioned by said shoulder.

4. A rear axle apparatus as defined in claim 1, wherein said rotation stopper means comprises belt means mounted in an interface formed between said ring gear and said inner peripheral surface and between said brake support and said inner peripheral surface, and extending parallel to an axis of said rear axle.

5. A rear axle apparatus as defined in claim 1, wherein said rotation stopper means comprises a knock pin mounted in an interface formed between said ring gear and said inner peripheral surface and between said brake support and said inner peripheral surface, and extending parallel to an axis of said rear axle.

6. A rear axle apparatus as defined in claim 1, wherein said rotation stopper means comprises a knock pin mounted in an interface formed between said ring gear and said inner peripheral surface and between said brake support and said inner peripheral surface, and extending parallel to an axis of said rear axles, said spacer means being mounted on said knock pin.

7. A rear axle apparatus as defined in claim 1, further comprising a friction plate for contacting said brake disks, said friction plate being engaged with said spacer means to be unrotatable relative to said rear axle case.

8. A rear axle apparatus as defined in claim 2, wherein said brake support comprises an annular member including an outward end surface for contacting said ring gear, an inward end surface having a larger area than said outward end surface for contacting one of said brake disks, an outer peripheral surface of substantially fixed outside diameter extending from said inward end to said outward end surface and fitting with said inner peripheral surface, and an inner peripheral surface of substantially diminishing diameter from said outward end surface to said inward end surface.

9. A rear axle apparatus for a tractor having a differential gear shaft driven by power transmitted from a transmission, a rear axle connected to the differential gear shaft through a planetary reduction mechanism, and a brake for braking the differential gear shaft through brake disks engaged with the differential gear shaft, said apparatus comprising:

a rear axle case connectable to a case of said transmission and having an inner peripheral surface;

a ring gear included in said planetary reduction mechanism, said ring gear being mounted on said inner peripheral surface of said rear axle case;

a brake support having a supporting surface for receiving one of said brake disks, said brake support being mounted on said inner peripheral surface of said rear axle case, and said brake support being juxtaposed with said ring gear substantially along said rear axles;

rotation stopper means for limiting rotation of said brake support and said ring gear relative to said rear axle case; and at least one friction plate for contacting said brake disks, each said friction plate fixed to said rear axle case wherein said friction plate is unrotatable relative to said rear axle case.

10. A rear axle apparatus as defined in claim 9, wherein said inner peripheral surface of said rear axle case upon which said ring gear and said brake support are mounted has a constant inner diameter.

11. A rear axle apparatus as defined in claim 9, further comprising a pin extending through each said friction plate for fixing said friction plate to said rear axle case.

12. A rear axle apparatus as defined in claim 9, wherein said rotation stopper means for limiting rotation of said brake support and said ring gear relative to said rear axle case prevents rotation of said friction plate relative to said rear axle case.

13. A rear axle apparatus as defined in claim 9, further comprising a presser ring adapted to be in contact with an innermost surface of an innermost one of said brake disks.

* * * * *